(12) United States Patent
Otsuki et al.

(10) Patent No.: US 8,758,920 B2
(45) Date of Patent: Jun. 24, 2014

(54) BATTERY ACCOMMODATING DEVICE, PORTABLE DEVICE, OUTPUT DEVICE, AND HEAD MOUNT DISPLAY

(75) Inventors: Masaki Otsuki, Yokohama (JP); Satoshi Ejima, Tokyo (JP)

(73) Assignee: Nikon Corporation, Tokyo (JP)

( * ) Notice: Subject to any disclaimer, the term of this patent is extended or adjusted under 35 U.S.C. 154(b) by 1005 days.

(21) Appl. No.: 12/312,957

(22) PCT Filed: Mar. 3, 2008

(86) PCT No.: PCT/JP2008/000419
§ 371 (c)(1),
(2), (4) Date: Jun. 2, 2009

(87) PCT Pub. No.: WO2008/108091
PCT Pub. Date: Sep. 12, 2008

(65) Prior Publication Data
US 2010/0026609 A1 Feb. 4, 2010

(30) Foreign Application Priority Data

Mar. 8, 2007 (JP) .................. 2007-059006
Aug. 6, 2007 (JP) .................. 2007-204534

(51) Int. Cl.
*H01M 2/10* (2006.01)
(52) U.S. Cl.
USPC ........................................... 429/97; 429/100
(58) Field of Classification Search
USPC ................................... 429/96–100
See application file for complete search history.

(56) References Cited

U.S. PATENT DOCUMENTS 6,143,440 A * 11/2000 Volz et al. .................. 429/92
7,068,242 B2 6/2006 Kiyokawa

FOREIGN PATENT DOCUMENTS

| JP | A-2002-56830 | 2/2002 |
| JP | A-2002-232810 | 8/2002 |
| JP | A-2003-59471 | 2/2003 |
| JP | A-2005-5008 | 1/2005 |
| JP | A-2005-159638 | 6/2005 |

OTHER PUBLICATIONS

International Preliminary Report on Patentability and its English translation mailed Sep. 17, 2009.

* cited by examiner

*Primary Examiner* — Jonathan G Leong
(74) *Attorney, Agent, or Firm* — Oliff PLC

(57) ABSTRACT

The present application is intended to prevent an excessive pressure from acting on a battery due to an expansion of the battery. A battery accommodating device having a battery chamber, which is formed in a housing and in which a battery is accommodated, the battery chamber being covered with a cover member, and has a lock part which fixes the housing and the cover member and a lock release part which unlocks the lock part when the battery has expanded. An output device includes a lock member which, while the cover member is being mounted to the housing, engages with a part of the cover member to prevent separation of the cover member and a displacement transmitting member, which transmits an expansive displacement of a battery to the lock member and releases the engagement of the lock member with a part of the cover member.

13 Claims, 15 Drawing Sheets (a)

(b)

BATTERY ACCOMMODATING DEVICE, PORTABLE DEVICE, OUTPUT DEVICE, AND HEAD MOUNT DISPLAY

CROSS REFERENCE TO THE RELATED APPLICATIONS

This application is a U.S. National Stage application claiming the benefit of prior filed International Application Number PCT/JP2008/000419, filed Mar. 3, 2008 in which the International Application claims priorities from Japanese Patent Application Numbers 2007-059006 (filed on Mar. 8, 2007) and 2007-204534 (filed on Aug. 6, 2007), the entire contents of which are incorporated herein by reference.

TECHNICAL FIELD

The present invention relates to battery accommodating devices for accommodating a battery, and portable devices. The present invention also relates to output devices, such as a headphone and a head mount display, in which a user can enjoy sounds or enjoy images and sounds with the device worn on the user's head.

BACKGROUND ART

It is known that rechargeable batteries, such as a lithium-ion rechargeable battery and a lithium polymer rechargeable battery, will expand if discharging and charging are repeated. Then, in a battery accommodating device for accommodating such a battery, an expansion of the battery is predicted and a space for a battery chamber is secured in advance, thereby allowing an expansion of the battery.

Conventional technical documents relating to the present invention are listed below.
Patent Document 1: Japanese Unexamined Patent Application Publication No. 2005-159638
Patent Document 2: Japanese Unexamined Patent Application Publication No. 2002-232810

DISCLOSURE OF THE INVENTION

Problems to be Solved by the Invention

However, in the conventional battery accommodating devices, if a battery is defective or poorly designed, the battery will expand beyond prediction and therefore an expansion of the battery is likely to be blocked by a cover member covering a battery chamber. If the expansion of a battery is blocked in this manner, an excessive pressure acts on the battery and as a result the normal operation of the battery is likely to be blocked and furthermore the internal parts of the battery or the housing are likely to be damaged.

The present invention has been made in order to solve such conventional problems, and is intended to provide a battery accommodating device, a portable device, an output device, and a head mount display capable of preventing an excessive pressure from acting on a battery due to an expansion of the battery.

Means for Solving the Problems

According to a first aspect of the present invention, there is provided a battery accommodating device having a battery chamber, which is formed in a housing and in which a battery is accommodated, the battery chamber being covered with a cover member, the battery accommodating device has a lock part which fixes the housing and the cover member and a lock release part which unlocks the lock part when the battery has expanded.

According to a second aspect of the present invention, there is provided the battery accommodating device according to the first aspect, in which the lock part includes a lock member which locks the cover member to the housing, and the lock release part unlocks the lock member by an expansion of the battery.

According to a third aspect of the present invention, there is provided the battery accommodating device according to the second aspect, in which the lock release part includes a detector which detects an expansion of the battery and a moving part which moves the lock member to a lock release position when an expansion of the battery is detected by the detector.

According to a fourth aspect of the present invention, there is provided the battery accommodating device according to the third aspect, in which the detector is a pressure sensor arranged at a position where the detector is pressed by an expansion of the battery.

According to a fifth aspect of the present invention, there is provided the battery accommodating device according to the first aspect, in which the lock part includes a lock member arranged movably to either of the cover member and the housing, and the lock release part moves the lock member by an expansion of the battery and unlocks the lock member.

According to a sixth aspect of the present invention, there is provided the battery accommodating device according to the fifth aspect, in which the lock release part includes a moving member, which is connected to the lock member and moves the lock member by an expansion of the battery.

According to a seventh aspect of the present invention, there is provided the battery accommodating device according to any one of the first to sixth aspects further has an opening part which uncovers the cover member covering the battery chamber when the lock is released by the lock release part.

According to an eighth aspect of the present invention, there is provided the battery accommodating device according to the seventh aspect, in which the opening part includes a biasing member which biases the cover member to an opening direction.

According to a ninth aspect of the present invention, there is provided the battery accommodating device according to the seventh or eighth aspect, further has a separating part which separates the battery from the battery chamber when the lock is released by the lock release part.

According to a tenth aspect of the present invention, there is provided the battery accommodating device according to the ninth aspect, in which the separating part includes a biasing member which biases the battery to the cover member side.

According to an eleventh aspect of the present invention, there is provided a battery accommodating device having a battery chamber, which is formed in a housing and in which a battery is accommodated, the battery chamber being covered with a cover member, in which the cover member includes an expansion permitting part, which deforms by a pressing force due to an expansion of the battery and allows the battery to expand.

According to a twelfth aspect of the present invention, there is provided the battery accommodating device according to the eleventh aspect, in which the expansion permitting part includes a slit formed in the cover member.

According to a thirteenth aspect of the present invention, there is provided the battery accommodating device according to the eleventh aspect, in which the expansion permitting part includes an elastically deforming part formed at least in a part of the cover member.

According to a fourteenth aspect of the present invention, there is provided the battery accommodating device according to any one of the first to thirteenth aspects, in which an expansion of the battery is an expansion of the widest surface of the battery.

According to a fifteenth aspect of the present invention, there is provided a portable device including the battery accommodating device according to any one of the first to fourteenth aspects.

According to a sixteenth aspect of the present invention, there is provided an output device including a sound output part outputting a sound and a battery accommodating part accommodating a battery, in which the battery accommodating part includes a removable cover member, a housing having a battery chamber formed therein, a lock member which, while the cover member is being mounted to the housing, engages with a part of the cover member to prevent separation of the cover member, and a displacement transmitting member, which transmits an expansive displacement of a battery accommodated in the battery chamber to the lock member and releases the engagement of the lock member with a part of the cover member.

According to a seventeenth aspect of the present invention, there is provided the output device according to the sixteenth aspect, in which the displacement transmitting member is a structure which, when contracted in a first direction, extends in a second direction different from the first direction, thereby changing the direction of a displacement and transmitting the displacement, in which one end of the displacement transmitting member is connected to the lock member and arranged at a position where the displacement transmitting member is pressed in the first direction by an expansion of the battery, whereby the displacement transmitting member transmits a displacement in the first direction due to an expansion of the battery to the lock member, and in which the lock member releases engagement with a part of the cover member when subjected to a displacement due to elongation of the displacement transmitting member.

According to an eighteenth aspect of the present invention, there is provided the output device according to the seventeenth aspect, in which the displacement transmitting member has elasticity and maintains an engagement between the lock member and a part of the cover member by a tension in the second direction.

According to a nineteenth aspect of the present invention, there is provided the output device according to the eighteenth aspect, in which the displacement transmitting member is biased by a press in the first direction, and extends in the first direction and presses the battery when the lock is released by the lock member.

According to a twentieth aspect of the present invention, there is provided the output device according to any one of the sixteenth to nineteenth aspects, in which the cover member includes a lock piece having, in a part thereof, a hole for engaging with the lock member, in which the lock member includes a lock part having, in a part thereof, a clinch part to engage with the hole, and a supporting part which displaceably supports the lock part, in which the clinch part engages with the hole to prevent separation of the cover member when the cover member is mounted to the opening of the housing, and the supporting part undergoes a displacement due to an elongation in the second direction of the displacement transmitting member, and due to this displacement the lock part is displaced and the clinch part separates from the hole, thereby releasing the engagement.

According to a twenty-first aspect of the present invention, there is provided the output device according to any one of the sixteenth to twentieth aspects, in which the battery accommodating part is provided away from the sound output part.

According to a twenty-second aspect of the present invention, there is provided a head mount display provided with an image output part which outputs an image to the output device according to any one of the sixteenth to twenty-first aspects.

According to the present invention, it is possible to prevent an excessive pressure from acting on a battery due to an expansion of the battery.

BRIEF DESCRIPTION OF THE DRAWINGS

FIG. 21(*b*) is a side view showing the embodiment of the head mount display according to the present invention.

DETAILED DESCRIPTION OF THE EMBODIMENTS

Hereinafter, embodiment of the present invention will be described in detail using the accompanying drawings.

First Embodiment

Figure 1:
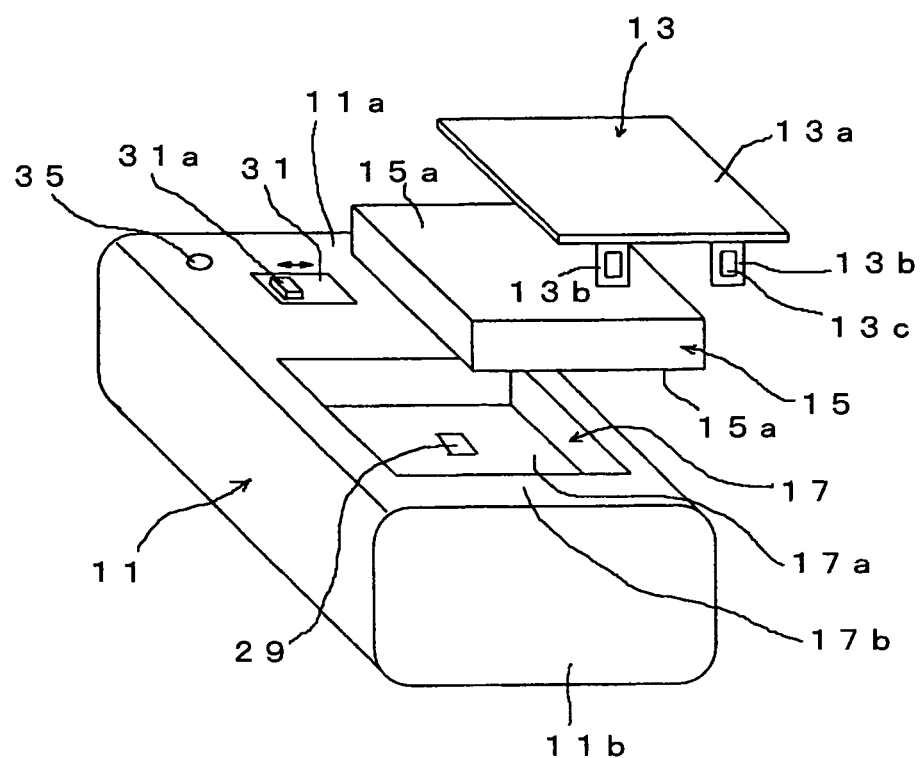
FIG. 1 is an exploded perspective view showing a first embodiment of a battery accommodating device of the present invention.
Figure 2:
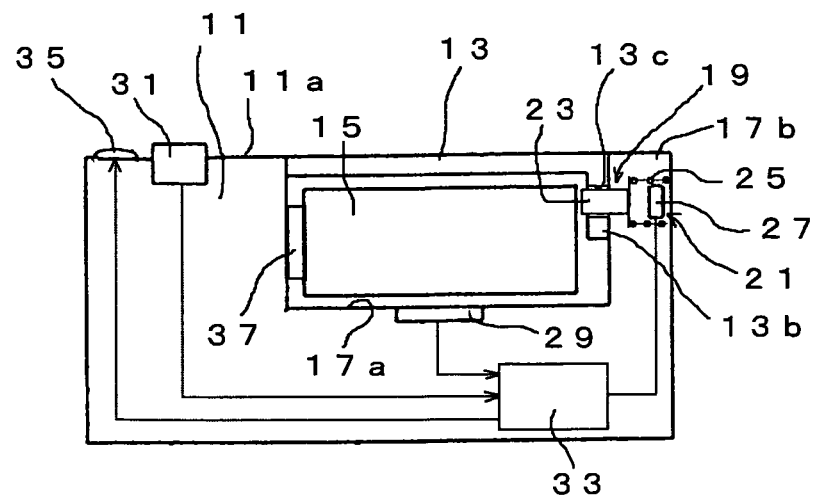
FIG. 2 is an explanatory view showing a cross section of the battery accommodating device of FIG. 1.

FIG. 1 and FIG. 2 show a first embodiment of a battery accommodating device of the present invention.

This battery accommodating device includes a housing 11 and a cover member 13.

A battery chamber 17 accommodating a battery 15 is formed in the housing 11. The housing 11 is formed in a rectangular parallelepiped shape. The battery chamber 17 is opened in a battery chamber surface 11a on one side of the housing 11. The battery chamber 17 is formed in a rectangular parallelepiped shape and has a bottom surface 17a. The battery chamber 17 is localized on one side in the longitudinal direction of the battery chamber surface 11a. A wall surface portion 17b is formed between the battery chamber 17 and an end face 11b of the housing 11.

The battery 15 is formed in a rectangular parallelepiped shape smaller than the battery chamber 17. The battery 15 is formed thin, in which the area of two out of six surfaces is large. One of large area surfaces 15a having the largest area is accommodated facing the bottom surface 17a of the battery chamber 17. A rechargeable battery, such as a lithium-ion rechargeable battery or a lithium polymer rechargeable battery, is used as the battery 15.

The cover member 13 is arranged covering an opening of the battery chamber 17 formed in the housing 11. The cover member 13 includes a lid 13a and a mounting part 13b. The lid 13a is arranged covering the opening of the battery chamber 17. The mounting part 13b is formed perpendicular to the lid 13a. A lock hole 13c is formed in the mounting part 13b. A lock member 23 provided in the wall surface portion 17b of the battery chamber 17 can fit in the mounting part 13b.

A lock mechanism 19 and a lock release mechanism 21 are arranged in the wall surface portion 17b as shown in FIG. 2.

The lock mechanism 19 fixes the cover member 13 to the housing 11. The lock mechanism 19 includes a lock member 23 and a coil spring 25. The lock member 23 can be inserted into and removed from the lock hole 13c formed in the mounting part 13b of the cover member 13. The lock member 23 is made up of a magnetic substance, such as iron. The coil spring 25 biases the lock member 23 to the mounting part 13b side.

The lock release mechanism 21 automatically releases the lock mechanism 19 when the battery 15 has expanded. Moreover, the lock mechanism 19 is unlocked, for example, when the battery 15 is replaced. The lock release mechanism 21 includes an electromagnet 27, a pressure sensor 29, a lock release switch 31, and a controller 33.

The electromagnet 27 is arranged at a position where the electromagnet 27 can attract the lock member 23 of the wall surface portion 17b to the opposite side of the mounting part 13b. The pressure sensor 29 detects an expansion of the battery 15. The pressure sensor 29 is placed in the bottom surface 17a of the battery chamber 17. A piezoelectric element or the like is used as the pressure sensor 29. The lock release switch 31 is placed in the battery chamber surface 11a of the housing 11 as shown in FIG. 1. The lock mechanism 19 is unlocked by turning the switch on by a slide operation of an operating part 31a by a user.

Signals from the pressure sensor 29 and the lock release switch 31 are input to the controller 33. A pressure signal from the pressure sensor 29 is input to the controller 33 constantly or at certain time intervals. When the pressure sensor 29 is pressed by an expansion of the battery 15 and a pressure acting on the pressure sensor 29 exceeds a predetermined threshold value k1, the controller 33 turns on the electromagnet 27. Moreover, the controller 33 turns on the electromagnet 27 when the lock release switch 31 is turned on.

In the battery chamber surface 11a of the housing 11, a warning lamp 35 comprising, for example, a red lamp is arranged. The controller 33 turns on the warning lamp 35 when the pressure acting on the pressure sensor 29 exceeds a second predetermined threshold value k2. The second threshold value k2 is set to a pressure value lower than the threshold value k1 for turning on the electromagnet 27. Accordingly, a user can recognize an expansion of the battery 15 earlier and replace the battery 15. In the battery chamber 17, a contact point 37 for making an electrical coupling with the battery 15 is arranged.

In the above-described battery accommodating device, when there is no expansion of the battery 15 or when the expansion of the battery 15 is small, the pressing force of the battery 15 acting on the pressure sensor 29 is small and a pressure not higher than the predetermine threshold value k1 acts on the pressure sensor 29.

Figure 3:
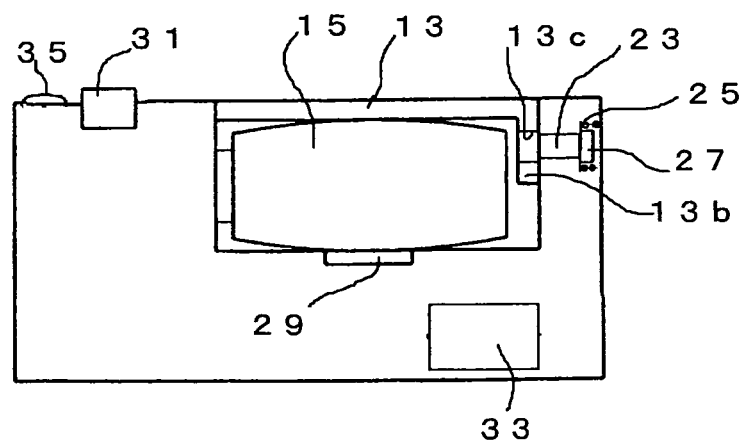
FIG. 3 is an explanatory view showing a state where a battery has expanded in FIG. 2.

On the other hand, when the battery 15 is defective or poorly designed, the battery 15 may expand beyond prediction as shown in FIG. 3. Since an expansion of the battery 15 is blocked by the cover member 13 covering the battery chamber 17, a pressure exceeding the predetermined threshold value k1 acts on the pressure sensor 29. The pressure signal from the pressure sensor 29 is input to the controller 33 constantly or at certain time intervals, whereby the controller 33 turns on the electromagnet 27 when the pressure acting on the pressure sensor 29 exceeds the predetermined threshold value k1. Because the electromagnet 27 is turned on, the lock member 23 is attracted by the electromagnet 27 and the cover member 13 is automatically unlocked. Due to the unlocking of the cover member 13, the cover member 13 will move in the direction of separating from the battery chamber 17 and the battery 15 is allowed to expand.

Then, for example, when replacing the battery, if the lock release switch 31 is turned on, then the electromagnet 27 is turned on by the controller 33 and the cover member 13 is unlocked.

In the above-described battery accommodating device, since the lock is automatically released when the pressure acting on the pressure sensor 29 exceeded a predetermined pressure, it is possible to prevent an excessive pressure from acting on the battery 15 due to an expansion of the battery 15. This eliminates the possibility that the normal operation of the battery 15 might be blocked and also that the internal parts of the battery 15 might be damaged.

Moreover, in the above-described battery accommodating device, when the lock release switch 31 is turned on, the electromagnet 27 is turned on and the cover member 13 is unlocked and therefore the battery 15 can be replaced easily.

Then, in the above-described battery accommodating device, since the pressure due to the deformation of the large area surface 15a of the battery 15 is detected with the pressure sensor 29, an expansion of the battery 15 can be detected reliably. Namely, in the case of the rectangular parallelepiped (also including sheet shaped) battery 15, the large area surface 15a having the largest area is structurally weakest. Therefore, when the battery 15 expands, the large area surface 15a expands most significantly. Accordingly, by detecting the pressure due to the expansion of this surface with the pressure sensor 29, the detection accuracy can be improved.

Second Embodiment

Figure 4:
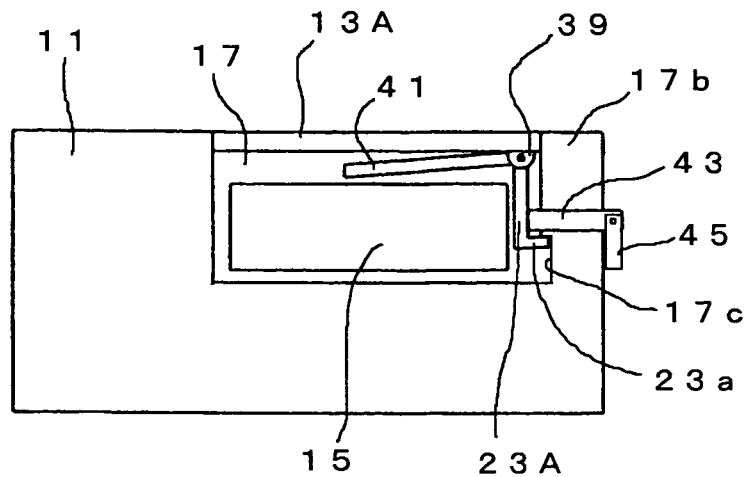
FIG. 4 is an explanatory view showing a second embodiment of the battery accommodating device of the present invention.

FIG. 4 shows a second embodiment of the battery accommodating device of the present invention.

Note that, in this embodiment, the same member as that of the first embodiment is given the same reference numeral to omit the detailed description thereof.

In this battery accommodating device, a hinge part 39 is fixed to the rear surface of the cover member 13A. The hinge part 39 is fixed to the wall surface portion 17b side of the housing 11. A lock member 23A is rotatably supported to the hinge part 39. The lock member 23A is positioned between the battery 15 and the wall surface portion 17b. A pivot member 41 is coupled together to the end of the lock member 23A on the hinge part 39 side. The pivot member 41 is positioned between the battery 15 and the cover member 13A. The pivot member 41 pivots about the hinge part 39 due to an expansion of the battery 15 and pivots the lock member 23A.

A lock part 23a is formed at the end of the lock member 23A opposite to the hinge part 39. The lock part 23a can be locked to a recess 17c formed on the inner surface of the wall surface portion 17b. A lock release member 43 is arranged in the wall surface portion 17b. A pressing member 45 is arranged at the back end of the lock release member 43. The pressing member 45 is pivotably arranged to the lock release member 43. By positioning and pressing the pressing member 45 along the axial direction of the lock release member 43, the lock member 23A pivots to move the lock release member 43 to the original position and thereby the lock of the lock part 23a of the lock member 23A to the recess 17c is released.

In the above-described battery accommodating device, when there is no expansion of the battery 15 or when the expansion of the battery 15 is small, as shown in FIG. 4, the lock part 23a of the lock member 23A locks to the recess 17c and the cover member 13A is locked to the battery chamber 17.

Figure 5:
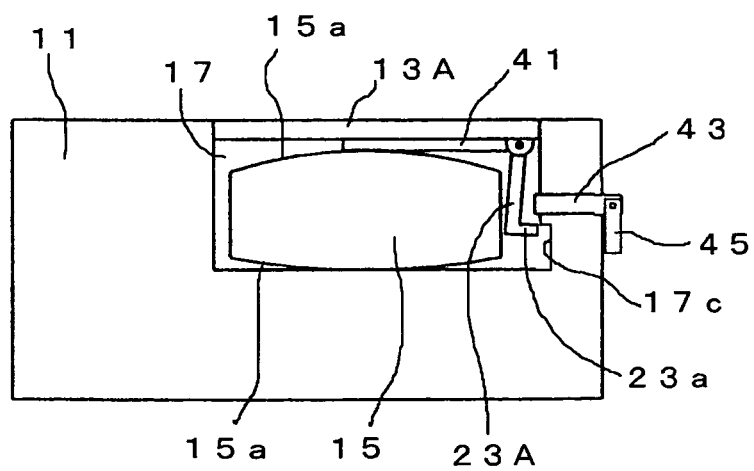
FIG. 5 is an explanatory view showing a state where a battery has expanded in FIG. 4.

On the other hand, when the battery 15 is defective or poorly designed, the battery 15 may expand beyond prediction as shown in FIG. 5. Then, the pivot member 41 pivots to the cover member 13A side due to an expansion of the battery 15. Thereby, the lock member 23A pivots toward the battery 15 side, and the lock of the lock part 23a of the lock member 23A to the recess 17c is released. Due to the unlocking of the lock part 23a, the cover member 13A will move in the direction of separating from the battery chamber 17 and the battery 15 is allowed to expand.

In the battery accommodating device of this embodiment, since the lock member 23A is unlocked by pivoting the pivot member 41 by an expansion of the battery 15, it is possible to prevent an excessive pressure from acting on the battery 15 due to an expansion of the battery 15.

Moreover, since the lock of the lock part 23a of the lock member 23A to the recess 17c is released by positioning and pressing the pressing member 45 along the axial direction of the lock release member 43, it is possible to replace the battery 15 easily.

In addition, since the lock of the lock part 23a is released by pivoting the pivot member 41 due to a large deformation of the large area surface 15a of the battery 15, the lock can be reliably released by an expansion of the battery 15.

Third Embodiment

Figure 6:
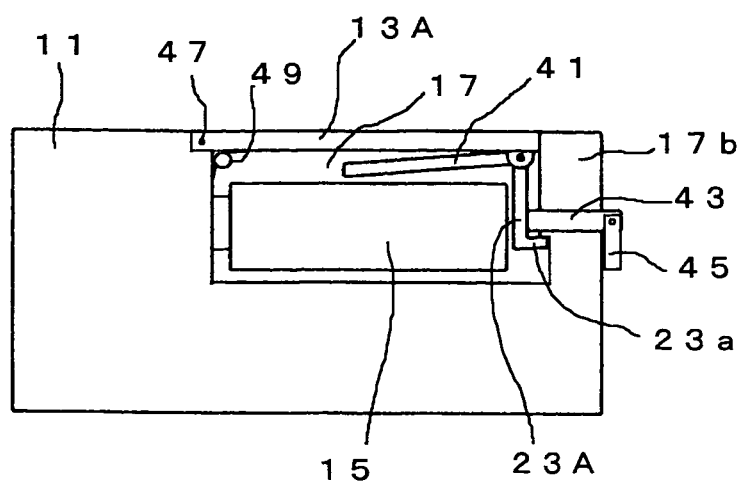
FIG. 6 is an explanatory view showing a third embodiment of the battery accommodating device of the present invention.

FIG. 6 shows a third embodiment of the battery accommodating device of the present invention.

In this battery accommodating device, the cover member 13A is provided in an openable and closable manner on the battery chamber 17. The side of the cover member 13A opposite to the wall surface portion 17b is pivotally fixed to the housing 11 by a pin member 47. A spring member 49 is arranged on the pin member 47 side of the cover member 13A. The cover member 13A is biased by the spring member 49 so as to pivot outward about the pin member 47.

Since the battery accommodating device of this embodiment is configured substantially similar to the second embodiment except the above-described points, the same member is given the same reference numeral to omit the detailed description thereof.

In the above-described battery accommodating device, when there is no expansion of the battery 15 or when the expansion of the battery 15 is small, as shown in FIG. 6, the lock part 23a of the lock member 23A locks to the recess 17c and the cover member 13A is locked to the battery chamber 17.

Figure 7:
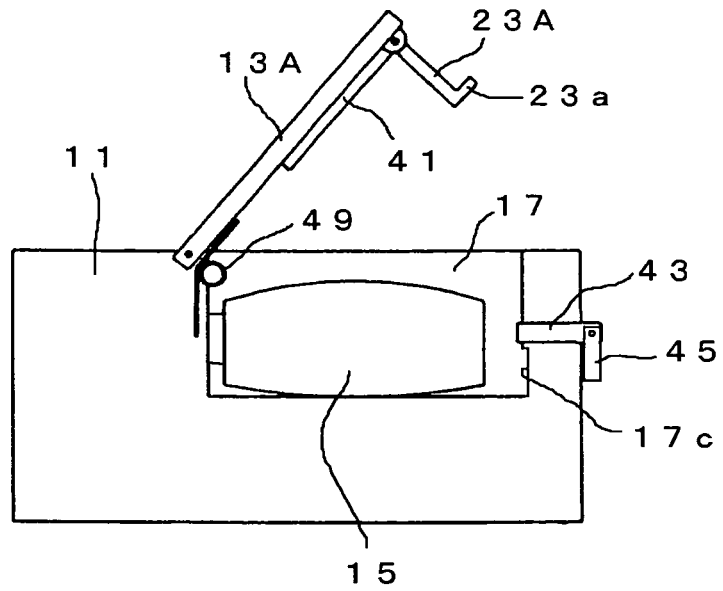
FIG. 7 is an explanatory view showing a state where a battery has expanded in FIG. 6.

On the other hand, when the battery 15 is defective or poorly designed, the battery 15 may expand beyond prediction as shown in FIG. 7. Then, the pivot member 41 pivots to the cover member 13A side due to an expansion of the battery 15 (see FIG. 5). Thereby, the lock member 23A pivots toward the battery 15 side, and the lock of the lock part 23a of the lock member 23A to the recess 17c is released. Due to the unlocking of the lock part 23a, the cover member 13A biased by the spring member 49 pivots about the pin member 47 and the battery chamber 17 is automatically opened.

In this embodiment, if the battery 15 has abnormally expanded, the cover member 13A automatically pivots to open the battery chamber 17 and it is therefore possible to reduce the potential damage of the battery chamber 17 due to the heat generation associated with the abnormal expansion of the battery 15. In addition, the battery 15 can be replaced easily.

Fourth Embodiment

Figure 8:
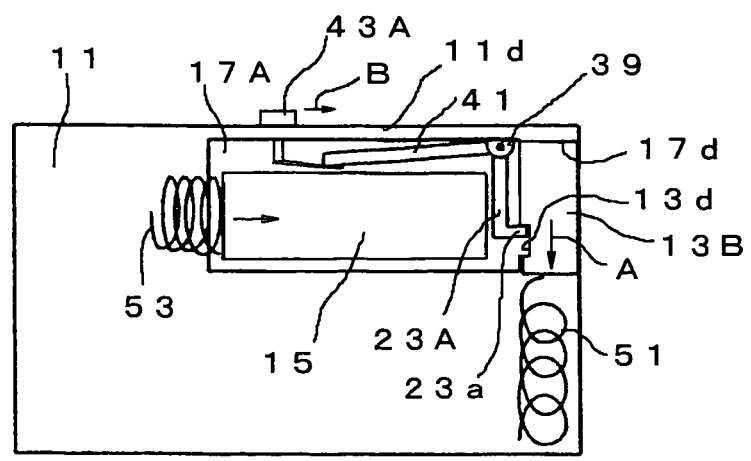
FIG. 8 is an explanatory view showing a fourth embodiment of the battery accommodating device of the present invention.

FIG. 8 shows a fourth embodiment of the battery accommodating device of the present invention.

Note that, in this embodiment, the same element as that of the second embodiment is given the same reference numeral to omit the detailed description thereof.

In this battery accommodating device, a battery chamber 17A is opened on a side face of the housing 11. An opening 17d is provided with a cover member 13B. The cover member 13B is biased toward the arrow direction marked A by a coil spring 51.

The hinge part 39 is fixed to the rear surface of an upper surface 11d of the housing 11. The hinge part 39 is fixed on the opening 17d side of the housing 11. The lock member 23A is pivotably supported to the hinge part 39. The lock member 23A is positioned between the battery 15 and the cover member 13B. The pivot member 41 is coupled together to the end of the lock member 23A on the hinge part 39 side. The pivot member 41 is positioned between the battery 15 and the upper surface 11*d*. The pivot member 41 pivots about the hinge part 39 by an expansion of the battery 15 and moves the lock member 23A.

The lock part 23*a* is formed at the end of the lock member 23A opposite to the hinge part 39. The lock part 23*a* can be locked to a recess 13*d* formed on the inner surface of the cover member 13B. A lock release member 43A is arranged on the upper surface 11*d* of the housing 11. The lock release member 43A can slide along the upper surface 11*d*. By sliding the lock release member 43A in the arrow direction B, the pivot member 41 pivots and the lock is released. A coil spring 53 is arranged on the opposite side of the cover member 13B of the battery chamber 17A. The battery 15 is biased to the cover member 13B side by the coil spring 53.

In the battery accommodating device of this embodiment, when there is no expansion of the battery 15 or when the expansion of the battery 15 is small, as shown in FIG. 8, the lock part 23*a* of the lock member 23A locks to the recess 13*d*, and the cover member 13B is locked to the battery chamber 17A.

Figure 9:
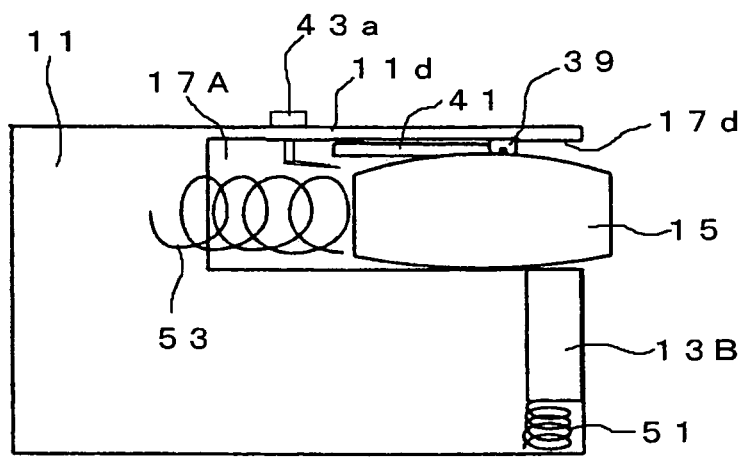
FIG. 9 is an explanatory view showing a state where a battery has expanded in FIG. 8.

On the other hand, when the battery 15 is defective or poorly designed, the battery 15 may expand beyond prediction as shown in FIG. 9. Then, the pivot member 41 pivots to the upper surface 11*d* side due to an expansion of the battery 15. Thereby, the lock member 23A pivots toward the battery 15 side, and the lock of the lock part 23*a* of the lock member 23A to the recess 13*d* is released (see FIG. 8). Due to the unlocking of the lock part 23*a*, the cover member 13B biased by the spring member 51 moves to the arrow direction marked A and the opening 17*d* of the battery chamber 17A is automatically opened.

In this embodiment, if the battery 15 has abnormally expanded, the cover member 13B automatically pivots to open the battery chamber 17A and it is therefore possible to reduce the potential damage of the battery chamber 17A due to the heat generation associated with the abnormal expansion of the battery 15. In addition, the battery 15 can be replaced easily.

Fifth Embodiment

Figure 10:
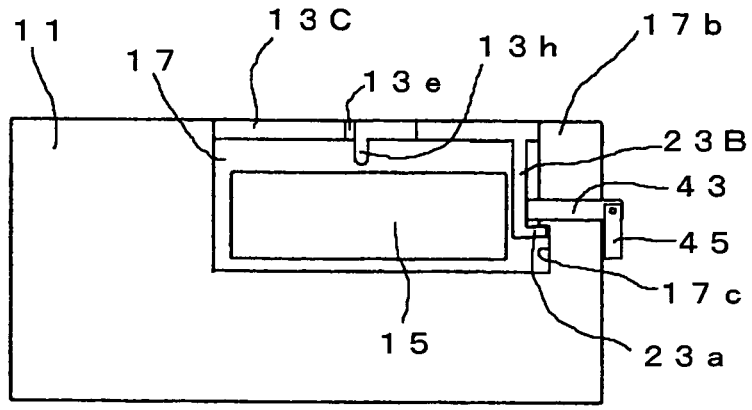
FIG. 10 is an explanatory view showing a fifth embodiment of the battery accommodating device of the present invention.

FIG. 10 shows a fifth embodiment of the battery accommodating device of the present invention.

Note that, in this embodiment, the same member as that of the second embodiment is given the same reference numeral to omit the detailed description thereof.

In this battery accommodating device, a lock member 23B is integrally formed on the rear surface of a cover member 13C. The lock member 23B is positioned between the battery 15 and the wall surface portion 17*b*. The lock part 23*a* is formed on the tip side of the lock member 23B. The lock part 23*a* can be locked to the recess 17*c* formed on the inner surface of the wall surface portion 17*b*. The lock release member 43 is arranged in the wall surface portion 17*b*.

Figure 11:
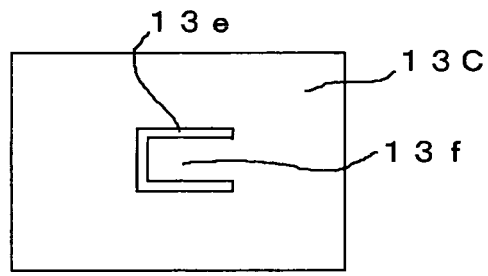
FIG. 11 is an explanatory view showing the detail of a cutout of FIG. 10.

The cover member 13C is formed from a material such as an elastically deformable resin. A cutout 13*e* is formed in the center of the cover member 13C. The cutout 13*e* is formed in rectangular shape as shown in FIG. 11. A deformation part 13*f* is formed on the inner side of the cutout 13*e*. Inside the deformation part 13*f*, a projection 13*h* projecting toward the battery 15 side is formed as shown in FIG. 10.

In the above-described battery accommodating device, when there is no expansion of the battery 15 or when the expansion of the battery 15 is small, as shown in FIG. 10, the lock part 23*a* of the lock member 23B locks to the recess 17*c*, and the cover member 13C is locked to the battery chamber 17.

Figure 12:
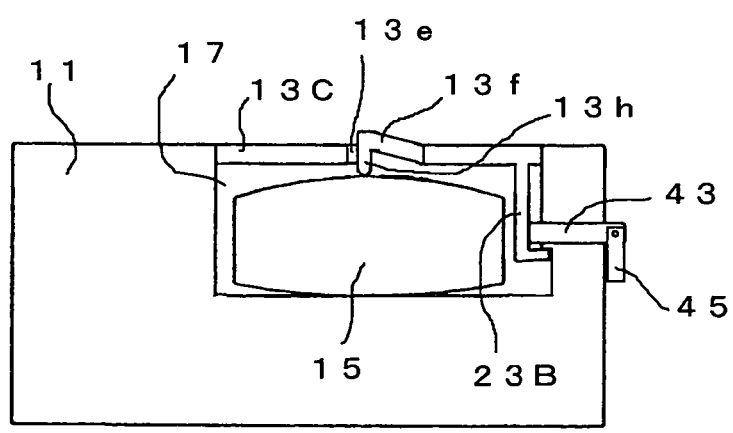
FIG. 12 is an explanatory view showing a state where a battery has expanded in FIG. 10.

On the other hand, when the battery 15 is defective or poorly designed, the battery 15 may expand beyond prediction as shown in FIG. 12. Then, the deformation part 13*f* of the cover member 13C projects outward due to an expansion of the battery 15.

In this embodiment, if the battery 15 has expanded, the deformation part 13*f* of the cover member 13C projects outward and It is therefore possible to prevent an excessive pressure from acting on the battery 15 due to an expansion of the battery 15. Moreover, with the outward projection of the deformation part 13*f* of the cover member 13C, a user can easily recognize an expansion of the battery 15.

Sixth Embodiment

Figure 13:
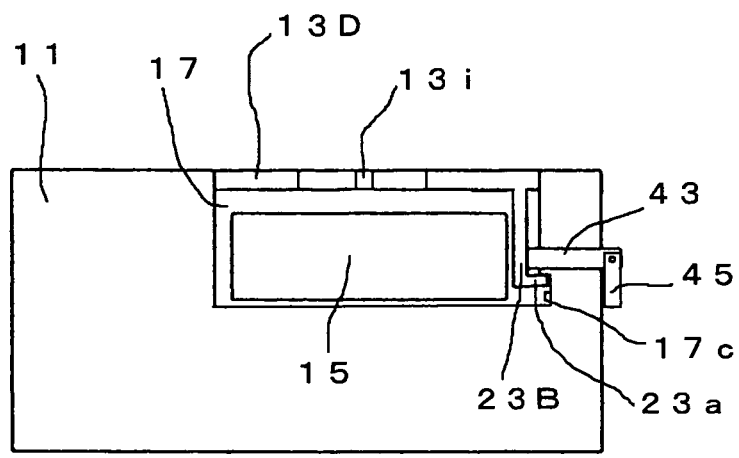
FIG. 13 is an explanatory view showing a sixth embodiment of the battery accommodating device of the present invention.

FIG. 13 shows a sixth embodiment of the battery accommodating device of the present invention.

Note that, in this embodiment, the same element as that of the fifth embodiment is given the same reference numeral to omit the detailed description thereof.

Figure 14:
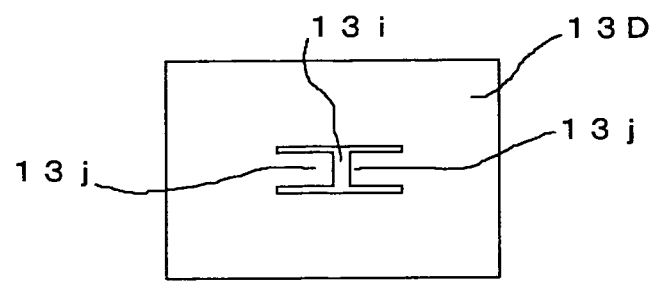
FIG. 14 is an explanatory view showing the detail of a cutout of FIG. 13.

In this battery accommodating device, a cover member 13D is formed from a material such as an elastically deformable resin. A cutout 13*i* is formed in the center of the cover member 13D. The cutout 13*i* is formed in an H shape as shown in FIG. 14. A pair of deformation parts 13*j* are formed on the inner sides of the cutout 13*i*.

In this embodiment, when there is no expansion of the battery 15 or when the expansion of the battery 15 is small, as shown in FIG. 13, the lock part 23*a* of the lock member 23B locks to the recess 17*c*, and the cover member 13D is locked to the battery chamber 17.

Figure 15:
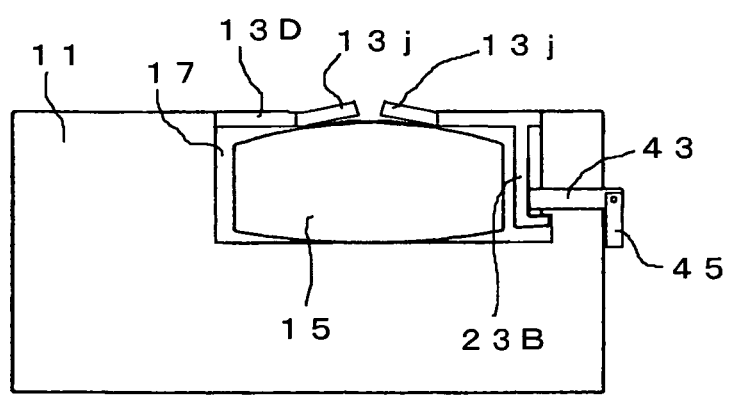
FIG. 15 is an explanatory view showing a state where a battery has expanded in FIG. 13.

On the other hand, when the battery 15 is defective or poorly designed, the battery 15 may expand beyond prediction as shown in FIG. 15. Then, the deformation parts 13*j* of the cover member 13D project outward due to an expansion of the battery 15.

In this embodiment, since the deformation parts 13*j* of the cover member 13D project outward if the battery 15 has expanded, it is possible to permit the expansion of the battery 15 reliably. Accordingly, it is possible to prevent an excessive pressure from acting on the battery 15 due to an expansion of the battery 15. Moreover, with the outward projection of the deformation part 13*j* of the cover member 13D, a user can recognize an expansion of the battery 15.

Note that, in this embodiment, an example has been described, in which the deformation parts 13*j* are formed by forming the cutout 13*i* in the cover member 13D, however, a part or all of the cover member 13D may be formed from an elastic member such as rubber so as to allow the battery 15 to expand.

Seventh Embodiment

Figure 16:
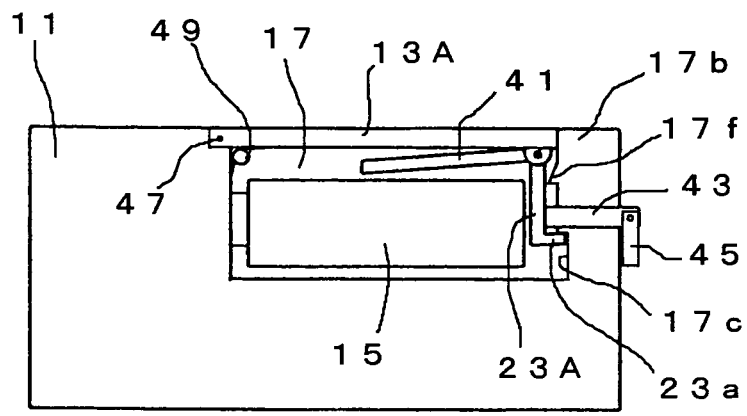
FIG. 16 is an explanatory view showing a seventh embodiment of the battery accommodating device of the present invention.

FIG. 16 shows a seventh embodiment of the battery accommodating device of the present invention.

In this battery accommodating device, a projection 17*f* is formed on the inner side of the wall surface portion 17*b* of the battery chamber 17. The projection 17*f* is formed in the vicinity of the opening of the battery chamber 17.

Note that, since the battery accommodating device of this embodiment is configured similar to that of the third embodiment except the above-described point, the same member is given the same reference numeral to omit the detailed description thereof.

In the battery accommodating device of this embodiment, when there is no expansion of the battery 15 or when the expansion of the battery 15 is small, as shown in FIG. 16, the lock part 23a of the lock member 23A locks to the recess 17c, so that the cover member 13A is locked to the battery chamber 17.

Figure 17:
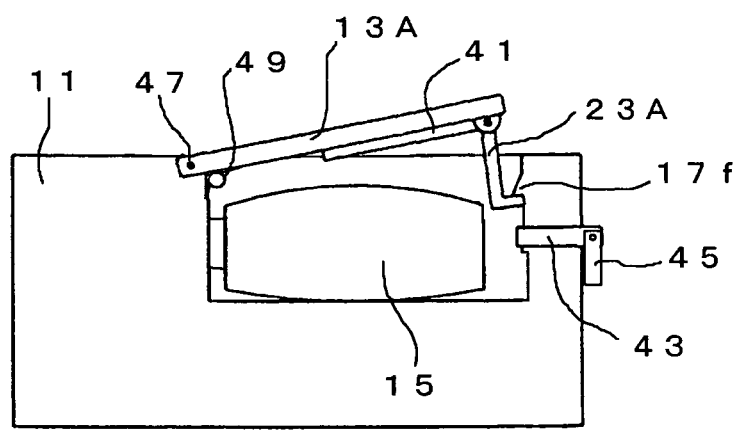
FIG. 17 is an explanatory view showing a state where a battery has expanded in FIG. 16.

On the other hand, when the battery 15 is defective or poorly designed, the battery 15 may expand beyond prediction as shown in FIG. 17. Then, due to an expansion of the battery 15, a pivot member 41 pivots and the lock of the lock part 23a of the lock member 23A to the recess 17c is released. Due to the unlocking of the lock part 23a, the cover member 13A biased by the spring member 49 pivots about the pin member 47, so that the battery chamber 17 is automatically opened. However, since the lock part 23a of the lock member 23A is locked to the projection 17f, the cover member 13A will stop at a position where the cover member 13A covers the battery chamber 17. Note that, by pulling upward the cover member 13A with fingers or the like, the lock of the lock part 23a of the lock member 23A to the projection 17f is released.

In this embodiment, if the battery 15 has abnormally expanded, the cover member 13A automatically pivots and the battery chamber 17 is opened. On the other hand, the lock part 23a of the lock member 23A is locked to the projection 17f and the cover member 13A stops at a position where the cover member 13A covers the battery chamber 17. It is therefore possible to prevent the battery 15 from falling out of the battery chamber 17 due to opening the cover member 13A.

Eighth Embodiment

Figure 19:
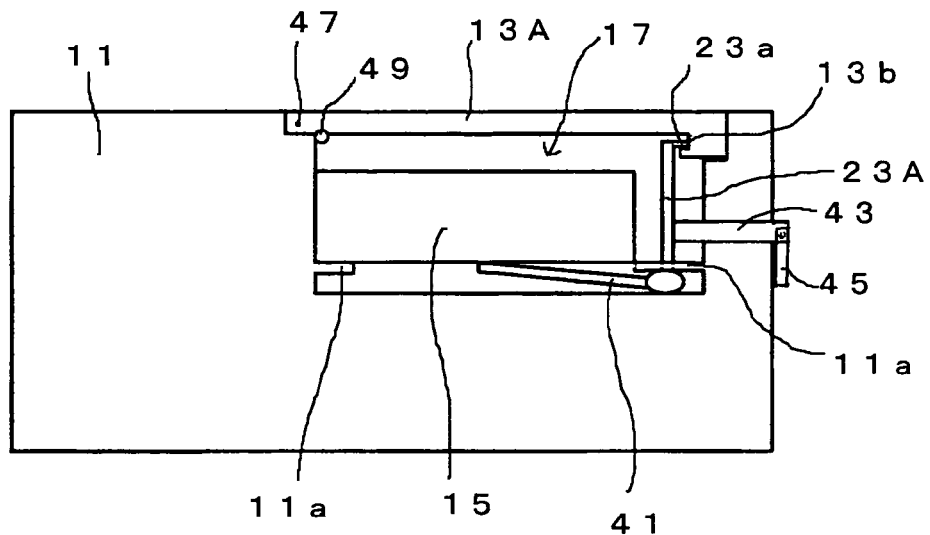
FIG. 19 is an explanatory view showing an eighth embodiment of the battery accommodating device of the present invention.

FIG. 19 shows an eighth embodiment of the battery accommodating device of the present invention.

In this battery accommodating device, the cover member 13A is provided in an openable and closable manner on the battery chamber 17.

Since the mounting structure between the cover member 13A and the housing 11 is the same as that of the third embodiment, the description thereof is omitted.

This embodiment differs from the third embodiment in that the lock member 23A and the pivot member 41 are pivotably fixed to the inner wall of the battery chamber 17 and that there is a recess 13b, into which the lock part 23a of the lock member 23A can be inserted, on the wall surface portion 17b side of the cover member 13A.

Since the member used in the third embodiment with the same reference numeral as that of FIG. 6, FIG. 7 is the same member, the description thereof is omitted.

Figure 20:
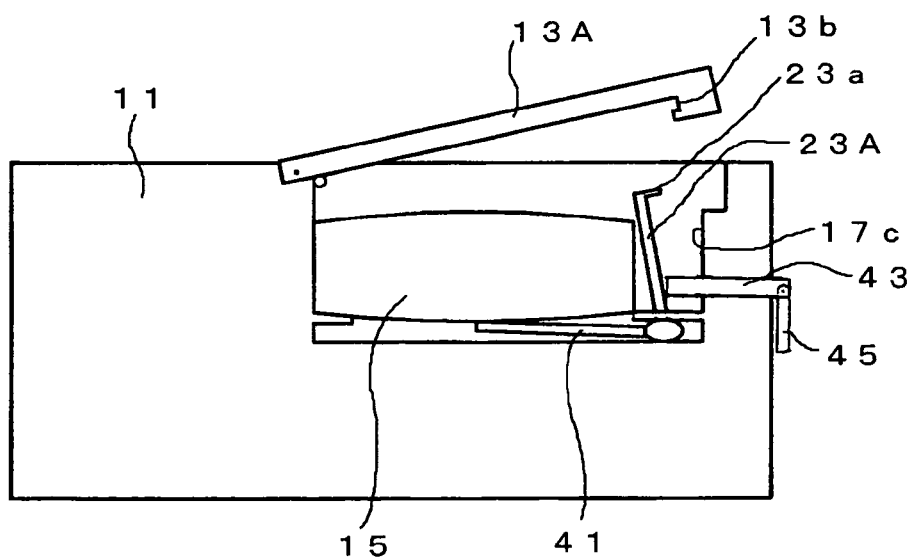
FIG. 20 is an explanatory view showing a state where a battery has expanded in FIG. 19.

As illustrated in FIG. 19, the battery 15 is held at a predetermined position of the battery chamber 17 by means of a battery lock part 11a. When the battery 15 is in the normal state, the cover member 13A is locked by the lock member 23A. On the other hand, if the battery 15 has expanded, the pivot member 41 is pushed downward and pivots downward. Along with this movement, as illustrated in FIG. 20, the lock member 23A pivots to the left side, the lock part 23a separates from the recess 13b, and the cover member 13A is unlocked.

In this manner, the lock member 23A may be held inside the battery chamber 17.

Ninth Embodiment

Figure 18:
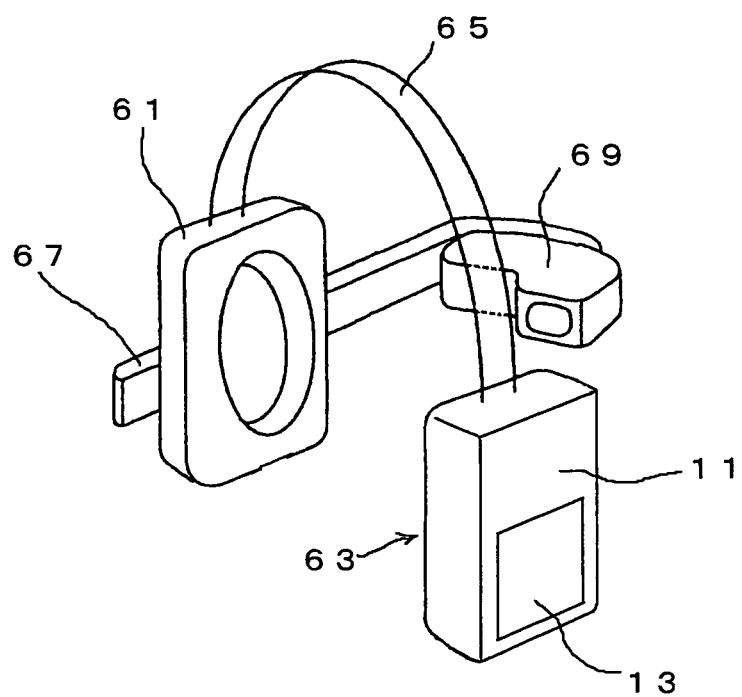
FIG. 18 is an explanatory view showing an embodiment of a portable device of the present invention.

FIG. 18 shows an embodiment of a portable device of the present invention. In this embodiment, the present invention is applied to a head mount display.

The head mount display includes a headphone 61 and a battery accommodating device 63. The battery accommodating device of each of the above-described embodiments can be used as the battery accommodating device 63. The headphone 61 and the battery accommodating device 63 are connected to each other by means of a head strap 65. A display unit 69 is connected to the headphone 61 via a side arm 67. When the head strap 65 is worn on a user's head, the headphone 61 and the battery accommodating device 63 are pressed against the user's ears and fixed to the user's head due to the elasticity of the head strap 65 and the display unit 69 is positioned in front of the user's eyes.

In the above-described head mount display, since the battery accommodating device 63 of the present invention is used, it is possible to prevent an excessive pressure from acting on the battery 15 due to an expansion of the battery 15, thereby improving the safety.

Note that, in this embodiment, an example of connecting the battery accommodating device 63 to one side of the head strap 65 has been described, but for example, the headphone 61 may be connected to both sides of the head strap 65 and the battery accommodating device 63 may be arranged on top of the head strap 65. Moreover, as the controller 33 of the first embodiment, a controller (CPU) controlling the head mount display may be used.

Tenth Embodiment

Figure 21:
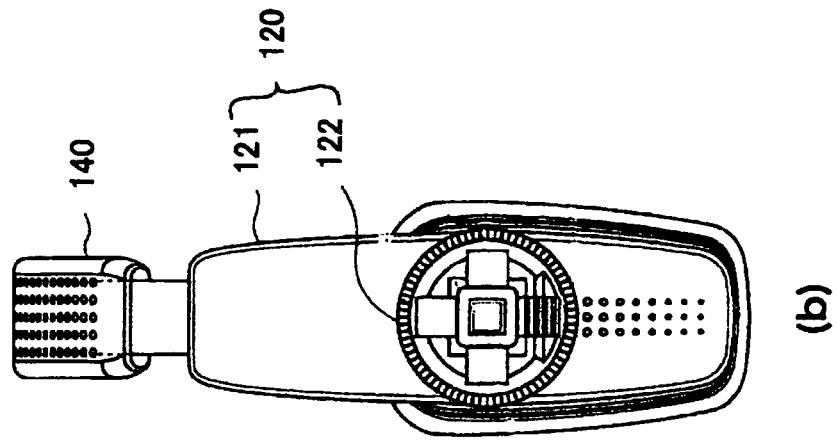
FIG. 21(*a*) is a perspective view showing an embodiment of a head mount display according to the present invention.
Figure 21:
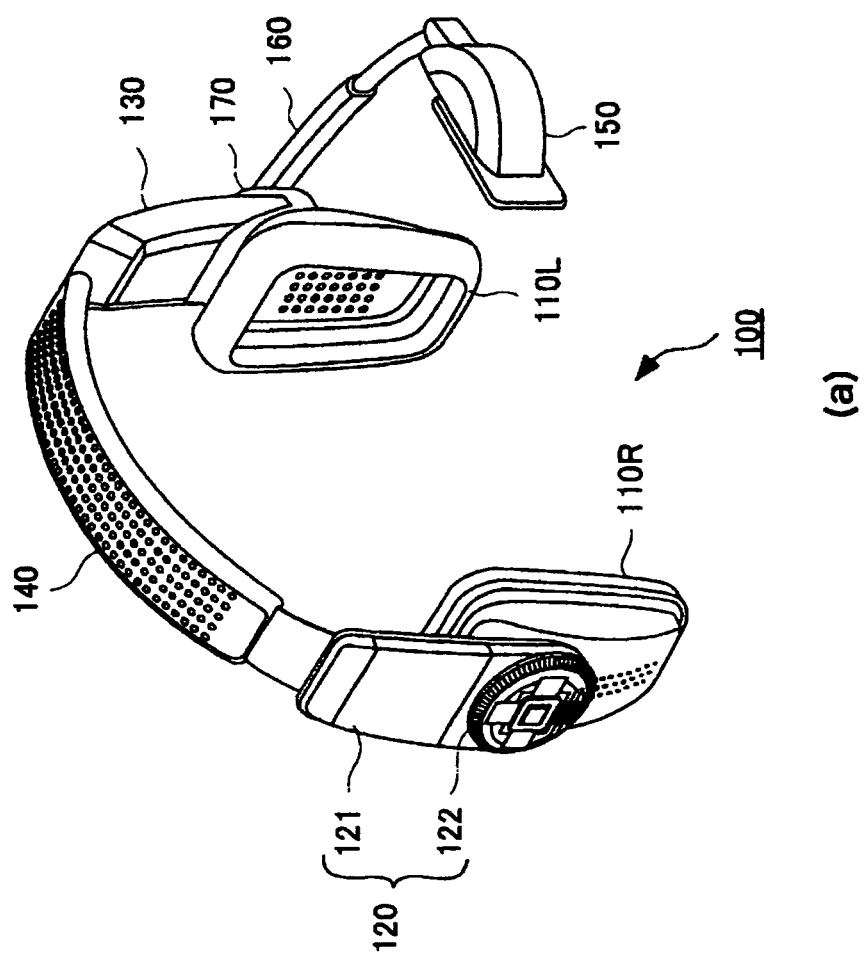

FIG. 21 shows an embodiment of the head mount display (hereinafter, referred to as HMD) of the present invention.

An HMD100 in FIG. 21 is a monocular HMD, in which FIG. 21(a) is a perspective view of the HMD100 and FIG. 21(b) is a side view of the HMD100.

The HMD100 includes a sound output part 110, an electric circuit part 120, a coupling part 130, a head strap 140, an image output part 150, an arm 160, and an arm supporting part 170.

The sound output part 110 converts a sound output signal output from a sound output device (not shown) into a sound and outputs the same. In this embodiment, the sound output part 110 has a right sound output part 110R and a left sound output part 110L. Moreover, the sound output part 110 functions also as a contact part to the user's ears when the HMD is worn on the user's head along with the later described head strap 140.

Note that a cable (not shown) and the like for receiving a sound output signal output from the sound output device (not shown) are coupled to the sound output part 110.

The electric circuit part 120 includes a battery accommodating part 121 capable of accommodating a battery, and supplies the power from a battery to the sound output part 110 and an image output part 150 described later.

Figure 22:
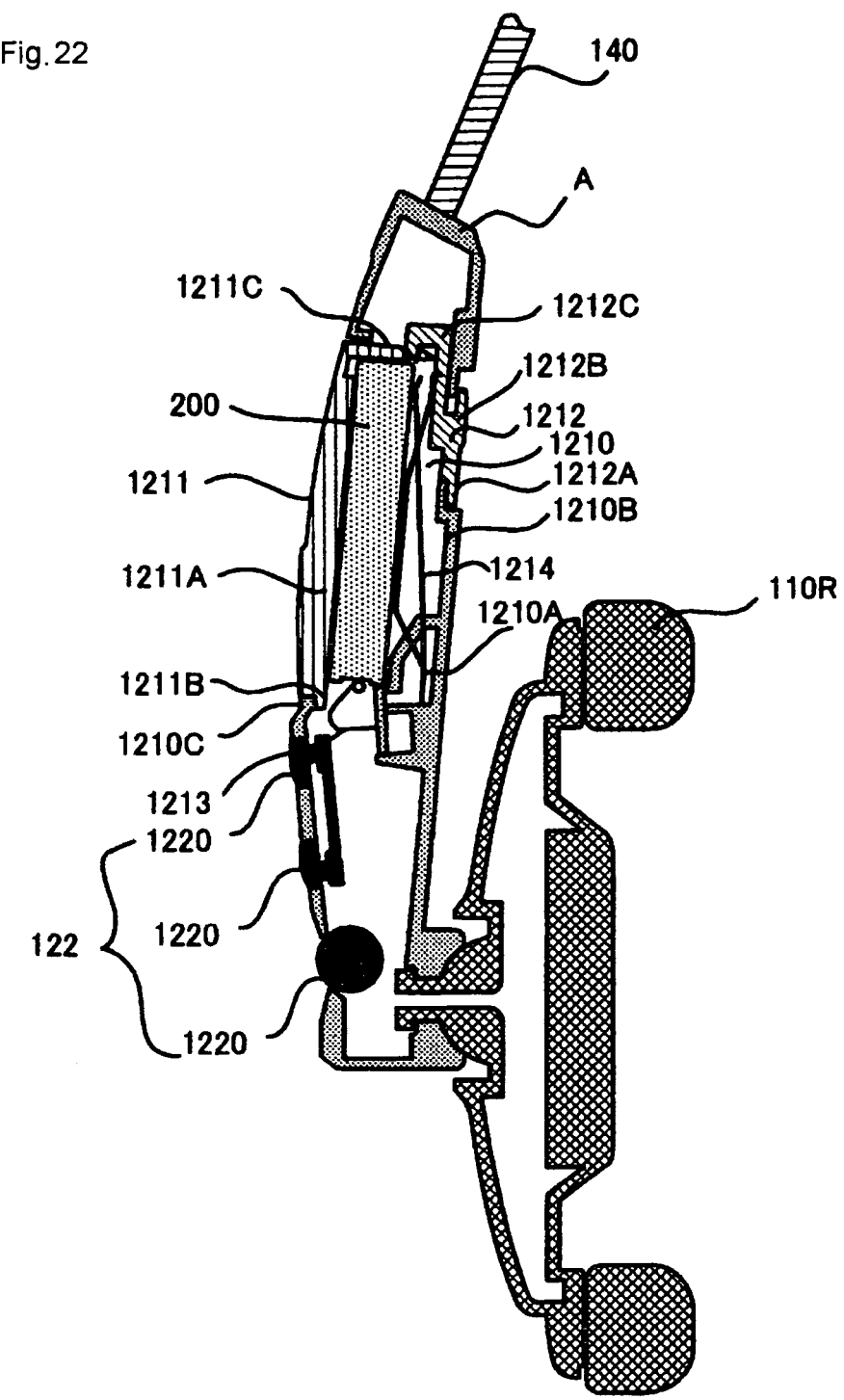
FIG. 22 is a cross sectional view showing a configuration example of an electric circuit part according to the present invention.

In this embodiment, as shown in FIG. 21 and FIG. 22, the electric circuit part 120 is provided independently from either of the sound output parts 110R, 110L. However, the electric circuit part 120 is mechanically and electrically coupled thereto. In this embodiment, the electric circuit part 120 is coupled to the right sound output part 110R. Of course, the electric circuit part 120 may be provided on the left sound output part 110L side. Moreover, the electric circuit part 120 is provided with an operating part 122 described later and receives instruction signals from the operating part 122. The electric circuit part 120 supplies a received instruction signal to the sound output part 110 and the image output part 150.

Figure 23:
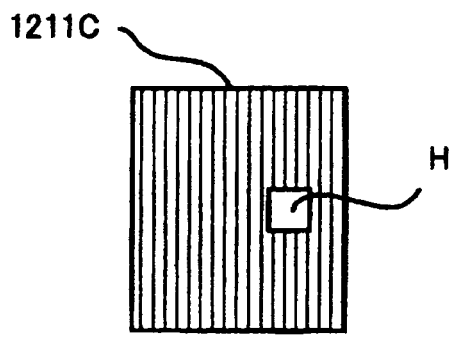
FIG. 23(a) is a top view of a cover member in FIG. 22.
FIG. 23(b) is an enlarged view of the electric circuit part in FIG. 22.
Figure 23:
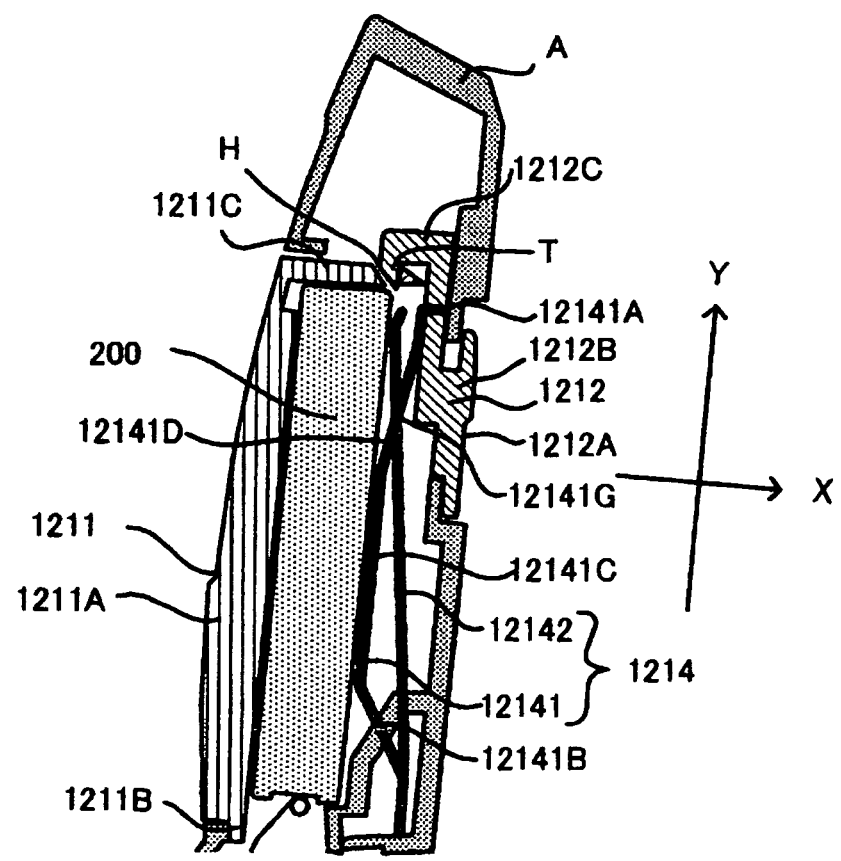

FIG. 22 and FIG. 23 are cross sectional views illustrating a configuration example of the electric circuit part 120. The electric circuit part 120 includes the battery accommodating part 121 and the operating part 122. The battery accommodating part 121 and the operating part 122 are formed in the shape of a housing A as shown in FIG. 22. In this embodiment, the housing A is provided as a part of the head strap 140 or is provided at a position where an end part of the head strap 140 is replaced with the housing A.

The battery accommodating part 121 includes a battery chamber 1210, a cover member 1211, a lock member 1212, a press-contact member 1213, and a displacement transmitting member 1214.

The sound output part 110R is connected to one end of the electric circuit part 120. Since the battery accommodating part 121 is provided in the electric circuit part 120, it will be accommodated in a housing different from the sound output part 110R. Accordingly, the battery accommodating part 121 and a battery to be accommodated may have less influence on the sound quality of the sound output part 110R.

The battery chamber 1210 forms a space, in which a flat-shaped battery 200 is accommodated so that the flat surface thereof may be along an extending direction of the head strap 140 when a user wears the HMD100. The battery chamber 1210 is open in a surface opposite to a surface of the housing A to which the sound output part 110R is attached. Specifically, the battery chamber 1210 is open in a surface on the side, which does not face a user's head when the head mount display is worn on the user's head. As the member to close this opening, a cover member 1211 is prepared.

On the back side viewed from the opening of the battery chamber 1210, a space 1210A accommodating the displacement transmitting member 1214 is provided. Moreover, in a wall surface (opposing surface of the cover member 1211) 1210B on the back side of the battery chamber 1210, a lock member 1212 is displaceably provided. Furthermore, when a battery is accommodated, the press-contact member 1213 is arranged on one of the sides of the battery and contacts the side face of the battery with pressure.

Moreover, the battery chamber 1210 includes a hooking part 1210C which hooks and supports a mounting part 1211B of the later-described cover member 1211.

The lock member 1212 includes a hooking part 1212A for being displaceably attached to the wall surface 1210B of the battery chamber 1210, a clinch part T which engages with an engagement hole H provided in a lock piece 1211C of the cover member 1211, a lock part 1212C supporting the clinch part T, and a supporting part 1212B which supports the lock part 1212C and the hooking part 1212A (FIG. 23(*b*)). The cover member 1211 is fixed by fitting the clinch part T of the lock member 1212 into the hole H provided in the lock piece 1211C of the later-described cover member 1211.

When the cover member 1211 is mounted to the opening of the housing A, the clinch part T engages with the hole H to prevent separation of the cover member 1211. Moreover, the supporting part 1212B undergoes a displacement due to the elongation in the second direction of the displacement transmitting member 1214 (Y direction in FIG. 23(*b*)), and then due to this displacement, the supporting part 1212B is displaced and the clinch part T separates from the hole H, thereby releasing the engagement.

The cover member 1211 includes a cover part 1211A, the mounting part 1211B, and the lock piece 1211C. The cover part 1211A is arranged covering the opening of the battery chamber 1210. The mounting part 1211B can be hooked with the hooking part 1210C of the battery chamber 1210. As shown in FIG. 23(*a*), the lock piece 1211C is provided with the hole H so as to be able to engage with the clinch part T of the lock member 1212.

The press-contact member 1213 has a spring material, for example. The press-contact member 1213 is in contact with the side face of the battery 200 accommodated in the battery chamber 1210, thereby fixing the battery.

The displacement transmitting member 1214 is a structure which, when it shrinks in a first direction (e.g., X axis direction of FIG. 23(*b*)), extends in a second direction different from the first direction (e.g., Y axis direction of FIG. 23(*b*)), thereby changing the direction of a displacement and transmitting the displacement. In this embodiment, the displacement transmitting member 1214 has a first member 12141 and a second member 12142. The first member 12141 includes a flat part 12141C, a part of which is in contact with the bottom surface of the battery, and both sides 12141B and 12141D of the flat part 12141C form slopes and are folded in a substantially trapezoidal shape. One end part 12141A of the first member 12141 is connected to the lock member 1212 and is also arranged at a position where it is pressed in the first direction (e.g., X axis direction of FIG. 23(*b*)) due to an expansion of the battery, whereby a displacement in the X axis direction due to the expansion of the battery 200 is converted into a displacement in the Y axis direction, which is then transmitted to the lock member 1212.

The displacement transmitting member 1214 includes a part 1214G where the first member 12141 and the second member 12142 mutually intersect in X-shape, for example, as shown in FIG. 23(*b*). By providing the second member 12142 and causing the same to intersect in X-shape, the battery can be supported stably.

The first member 12141 and the second member 12142 may be constructed with two members or may be constructed with a unitary member. Anyway, the displacement transmitting member 1214 constitutes a stretchable structure which, when it shrinks in the first direction (X axis direction in FIG. 23(*b*)), extends in the second direction (Y axis direction in FIG. 23(*b*)) perpendicular to the first direction. In this embodiment, the displacement transmitting member 1214 has elasticity. For example, the displacement transmitting member 1214 has a spring material. Specifically, the displacement transmitting member 1214 is formed by folding back a tabular or ribbon-shaped spring material. Of course, the displacement transmitting member is not limited thereto.

The displacement transmitting member 1214 is arranged between the battery 200 and the wall surface 1210B of the battery chamber 1210. The one end part 12141A of the displacement transmitting member 1214 is connected to the supporting part 1212B of the lock member 1212. For this reason, the displacement transmitting member 1214 is pressed in the first direction (X axis direction) by an expansion of the battery 200, and is displaced so as to shrink in the X axis direction and at the same time is displaced so as to extend in the second direction (Y axis direction), thereby transmitting this displacement to the supporting part 1212B of the lock member 1212.

In the lock member 1212, the supporting part 1212B undergoes a displacement due to an expansion in the Y axis direction of the transmitting member 1214, whereby the lock part 1212C is displaced in the Y axis direction so as to be away from the lock piece 1211C. As a result, the clinch part T separates from the hole H of the cover member and the engagement between the both is released.

When a force in the second direction is applied to the displacement transmitting member 1214, a tension is produced. For example, if the lock piece 1211C presses the clinch part T in mounting the cover member 1211 to the opening of the housing A, the lock part 1212C and the supporting part 1212B will be displaced. Due to this displacement, a force extending in the second direction in the coupling part 12141A is transmitted to the displacement transmitting member 1214 connected to the supporting part 1212B and as a result a tension is produced in the displacement transmitting member 12141. Here, when the clinch part T reaches the position of the hole H, the supporting part 1212B and lock part 1212C of the lock member 1212 are displaced in the Y axis direction by the tension of the displacement transmitting member 1214 so as to insert the clinch part T into the hole H. Thus, the engagement between the cover member 1211 and the lock member 1212 is maintained.

Moreover, the displacement transmitting member 1214 is biased by a press in the X axis direction, and when the lock member 1212 is unlocked, the displacement transmitting member 1214 extends in the X axis direction and presses the battery 200

The operating part 122 receives from an operation button 1220 the instructions, such as turning on/off the power or adjusting the volume, issued from a user to the HMD main body 100. The received operation is converted into an electric signal in a non-illustrated electric circuit, and the resultant electric signal is supplied to the sound output part 110 and the image output part 150.

The coupling part 130 is coupled to the left sound output part 110L. Moreover, the later-described image output part 150 is coupled to the coupling part 130 via the arm 160 and the arm supporting part 170.

Note that the battery accommodating part 121 which the electric circuit part 120 includes may be provided in the coupling part 130. Moreover, the coupling part 130 may have a configuration similar to that of the electric circuit part 120, e.g., a configuration for receiving instruction signals from the operating part 122.

The head strap 140 has a curved shape so as to be able to sandwich a user's head. Then, the electric circuit part 120 is connected and fixed to one end of the head strap 140 and the coupling part 130 is connected and fixed to the other end. The head strap 140 may be provided with wirings (not shown) for transmitting sound output signals from the sound output device.

The image output part 150 converts the image output signals output from an image output device into an image and outputs the same. In this embodiment, the image output part 150 is coupled to and supported by the coupling part 130 via the arm 160 and the arm supporting part 170.

Figure 24:
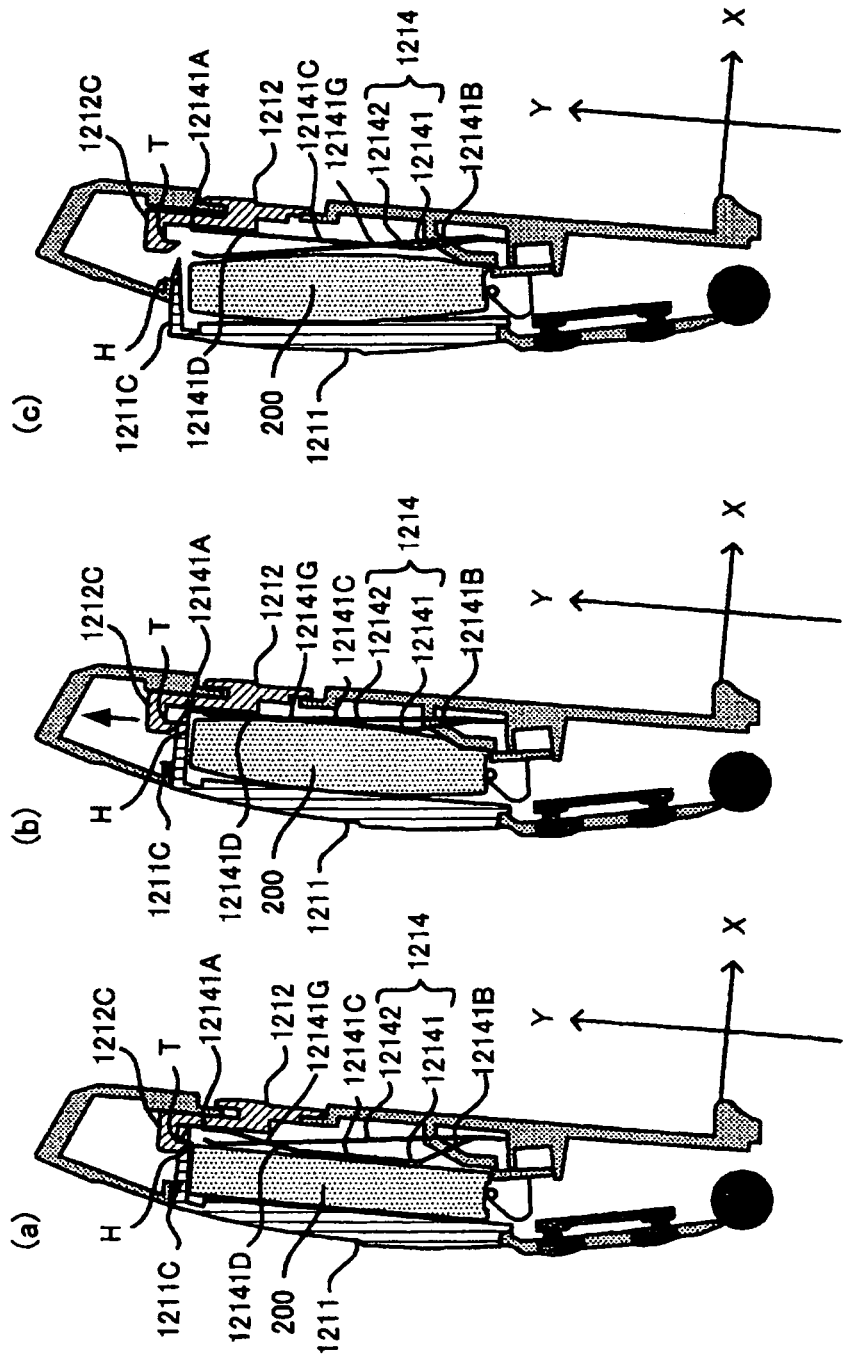
FIG. 24 shows cross sections of the electric circuit part in a state where a battery has expanded.
Figure 25:
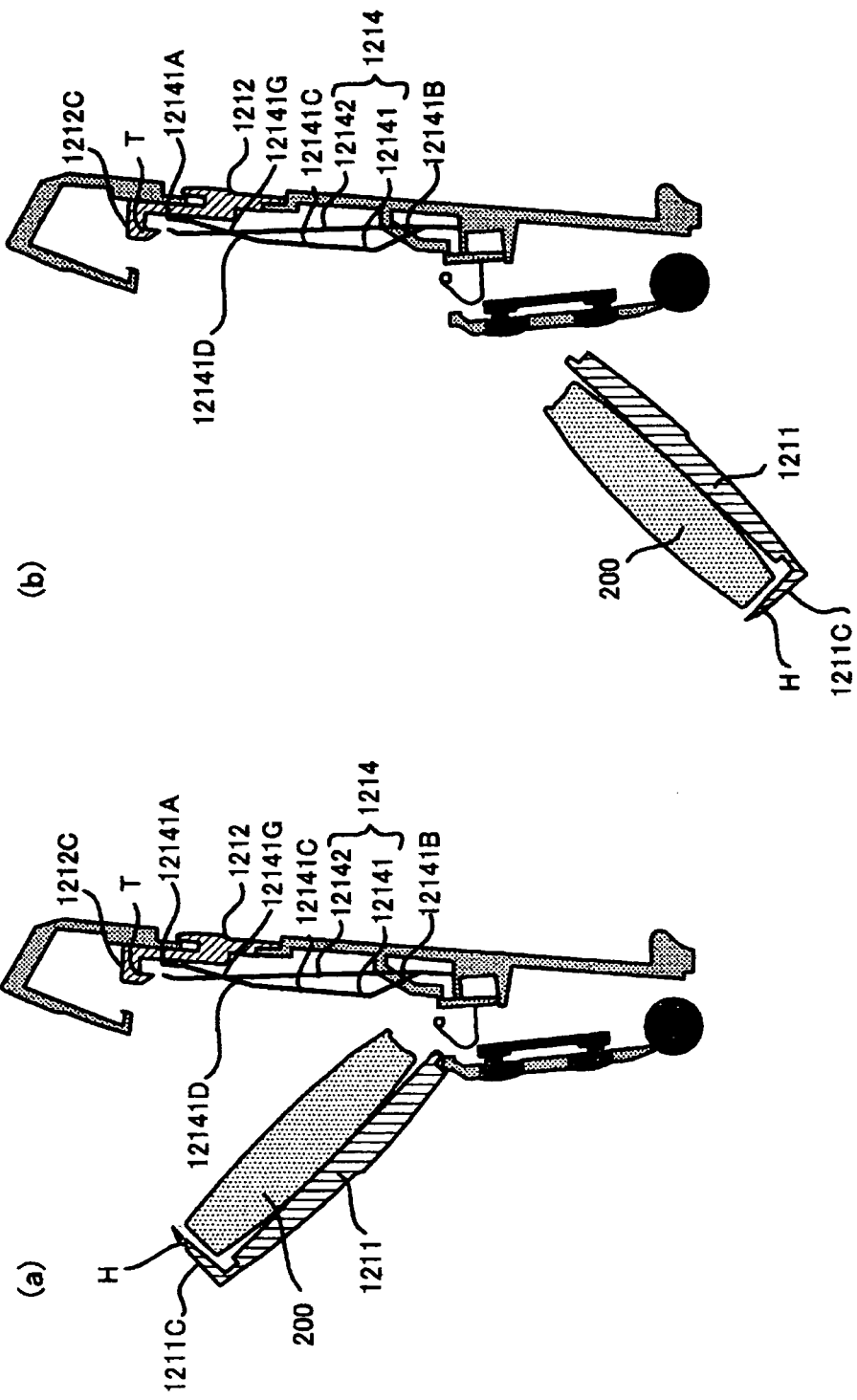
FIG. 25 shows cross sections of the electric circuit part in a state where a battery has expanded.

Next, the operations of the battery accommodating part 121 when the battery 200 has not expanded yet and when the battery has expanded are described using FIG. 24 to FIG. 25.

[When the Battery has not Expanded Yet]

First, when the battery 200 has not expanded yet, as shown in FIG. 24(*a*), the mounting part 1211B of the cover member 1211 is hooked with the hooking part 1210C of the battery chamber 1210, and the clinch part T of the lock part 1212C of the lock member 1212 fits into the hole H of the lock piece 1211C of the cover member 1211, whereby the cover member 1211 is fixed. As a result, the battery 200 is fixed in the battery chamber 1210.

In this case, the displacement transmitting member 1214 is lightly pressed by the battery with a normal thickness. However, the displacement transmitting member 1214 has not been displaced sufficiently to displace the lock member 1212. On the other hand, a tension acts against the displacement in the direction for the clinch part T to separate from the hole H, so the displacement is suppressed.

[When the Battery has Expanded]

On the other hand, the operation of the battery accommodating part 121 when the battery 200 has expanded is described.

The battery 200 may expand by repeatedly charging and discharging. In that case, the movement of the battery 200 is constrained by the cover member 1211 covering the battery chamber 1210. For this reason, a displacement force of the battery due to an expansion of the battery acts on the displacement transmitting member 1214. When the pressure by the battery 200 acts on the flat part 12141C of the first member 12141 of the displacement transmitting member 1214, the inclined parts 12141B and 12141D of the first member 12141 are displaced such that the angle between these parts opens, that is, the displacement transmitting member 1214 extends in the Y axis direction to displace one end 12141A of the first member 12141, thereby displacing the lock member 1212 in the Y axis direction of FIG. 23(*b*) (direction of arrow of FIG. 24(*b*)). At this time, the displacement transmitting member 1214 is biased so as to contract in the X axis direction, that is, a potential energy due to elasticity will be stored.

The lock member 1212 is displaced, and the clinch part T along with the lock part 1212C is displaced away from the lock piece 1211C of the cover-member 1211. As a result, the clinch part T of the lock part 1212C of the lock member 1212 will be pulled out from the hole H of the lock piece 1211C of the cover member 1211. Accordingly, the engagement of the clinch part T with the hole H is released. Namely, the lock part 1212C is unlocked (FIG. 24(*c*)).

Note that, when the lock of the hole H of the lock piece 1211C of the cover member 1211 with the clinch part 1212T of the lock part 1212C of the lock member 1212 is released, the bias due to the displacement in the X axis direction of the displacement transmitting member 1214 is released. At this time, the battery 200 is pushed toward the opening by the displacement transmitting member 1214.

Note that, depending on the status of use of the head mount display, the expanded battery 200 may drop along with the cover member 1211 from the HMD due to the self-weight of the battery, as shown in FIG. 25(*a*) and FIG. 25(*b*).

In this embodiment, the opening of the battery chamber 1210 is present in the surface on a side not facing the user's head. Accordingly, if the battery chamber 1210 is provided in advance so as to be able to accommodate the battery 200 such that the surface with the maximum area of the flat-shaped battery 200 may become substantially perpendicular to the ground surface, then when the battery 200 has expanded, the battery 200 will be ejected away from the user and drop toward the back or chest of the user.

Moreover, since the cover member 1211 in this embodiment is constructed so as to be able to separate from the opening, the cover member 1211 and the expanded battery 200 will be ejected as the lock is released.

In this embodiment, since the battery accommodating part 121 is accommodated in a housing different from that of the sound output part 110, it is possible to reduce the influence on the sound quality. For this reason, the sound quality characteristics of the right and left sound output parts will never be different.

That is, conventionally, a battery has been arranged in either of the left and right sound output parts. However, in a sound output part presumed to perform stereo reproduction, it is preferable that the left and right output parts be identical or symmetrical, considering the influences of the resonance frequency and the like on the sound quality. In particular, considering the countermeasure against the above-described expansion of the battery, the influence on the sound quality needs to be taken into account. Then, by accommodating the battery accommodating part 121 in a housing different from that of the sound output part 110, it is possible to reduce the influence on the sound quality.

Note that, in the present embodiments, HMD has been described, but the present invention can be applied to a headphone which outputs only sound.

Supplementary Notes on the Embodiments

In the foregoing paragraphs, the present invention has been described in detail, but the above-described embodiments and their modifications are just examples of the present invention and the present invention is not limited thereto. It is apparent that the modifications are possible without departing from the spirit and scope of the present invention. For example, the following configurations are possible.

(1) In the ninth embodiment described above, an example has been described, in which the battery accommodating device 63 of the present invention is applied to a head mount display, but the present invention can be widely applied to portable devices, such as, for example, a mobile phone. Then, when the present invention is used in a portable device, the cover members 13, 13A, 13B, 13C, and 13D are preferably provided at locations where each of the members will not contact a human body, a hand, a face, and the like. This can reduce possible heat injuries due to the heat generation when the battery 15 abnormally expanded.

(2) In the embodiments described above, examples have been described, in which the battery accommodating device of the present invention is independently constructed, but for example, the battery accommodating device of the present invention may be incorporated into a portable device and the like.

(3) In the embodiments described above (except the eighth embodiment), examples have been described, in which the largest surface of the rectangular parallelepiped battery 15 is covered with the cover members 13, 13A, 13C, and 13D so that the battery 15 easily separates from the battery chamber 17. However, for example, two or three surfaces of the battery 15 may be covered with the cover members.

(4) In the embodiments described above, examples have been described, in which the present invention is applied to a rechargeable battery, but the present invention can be also applied to primary batteries which may expand due to time-dependent changes.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A battery accommodating device comprising:
 a battery chamber which is formed in a housing of an electronic device, formed with an opening where a battery can be taken in and out, and accommodating the battery via the opening;
 a cover member which covers a whole of the opening;
 a lock part which fixes the cover member by locking the cover member at the opening of the housing; and
 a lock release part which unlocks the locking by the lock part when the battery has expanded,
 wherein when the locking by the lock part is unlocked, the battery becomes removable from the battery accommodation device.

2. The battery accommodating device according to claim 1, wherein
 the lock part includes a lock member which locks the cover member to the housing, and
 the lock release part unlocks the lock member by an expansion of the battery.

3. The battery accommodating device according to claim 2, wherein
 the lock release part includes:
 a detector which detects an expansion of the battery; and
 a moving part which moves the lock member to a lock release position when an expansion of the battery is detected by the detector.

4. The battery accommodating device according to claim 3, wherein
 the detector is a pressure sensor arranged at a position where the detector is pressed by an expansion of the battery.

5. The battery accommodating device according to claim 1, wherein
 the lock part includes a lock member arranged movably to either of the cover member and the housing, and
 the lock release part moves the lock member by an expansion of the battery and unlocks the lock member.

6. The battery accommodating device according to claim 5, wherein
 the lock release part includes a moving member, which is connected to the lock member and moves the lock member by an expansion of the battery.

7. The battery accommodating device according to claim 1, further comprising
 an opening part which uncovers the cover member covering the battery chamber when the lock is released by the lock release part.

8. The battery accommodating device according to claim 7, wherein
 the opening part includes a biasing member which biases the cover member to an opening direction.

9. The battery accommodating device according to claim 7, further comprising
 a separating part which separates the battery from the battery chamber when the lock is released by the lock release part.

10. The battery accommodating device according to claim 9, wherein
 the separating part includes a biasing member which biases the battery to the cover member side.

11. The battery accommodating device according to claim 1, wherein
 an expansion of the battery is an expansion of the widest surface of the battery.

12. A portable device including the battery accommodating device according to claim 1.

13. The battery accommodating device according to claim 1, wherein the cover member is structured such that when the locking by the lock part is unlocked, the cover member moves to accommodate the expanded battery and the battery becomes removable from the battery accommodation device.

* * * * *